(12) United States Patent
Itou (10) Patent No.: US 6,439,998 B1
(45) Date of Patent: Aug. 27, 2002

(54) GAME APPARATUS, GAME CONTROLLING METHOD AND RECORDING MEDIUM FOR USE WITH BATTLE VIDEO GAMES

(75) Inventor: Hiroyuki Itou, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/499,683

(22) Filed: Feb. 8, 2000

(30) Foreign Application Priority Data

Feb. 10, 1999 (JP) ............................................ 11-072449
Apr. 30, 1999 (JP) ............................................ 11-123260

(51) Int. Cl.⁷ ................................................ A63F 13/00
(52) U.S. Cl. .......................................... 463/43; 463/23
(58) Field of Search ............................... 463/43, 1, 7, 8, 463/23

(56) References Cited

U.S. PATENT DOCUMENTS

| 5,390,937 A | * | 2/1995 | Sakaguchi et al. | .......... 273/434 |
| 5,649,862 A | * | 7/1997 | Sakaguchi et al. | ............ 463/44 |

FOREIGN PATENT DOCUMENTS

| JP | 6-105959 | 4/1994 |
| JP | 8-280933 | 10/1996 |
| JP | 9-299614 | 11/1997 |
| JP | 10244072 | 9/1998 |
| JP | 11179049 | 7/1999 |
| JP | 11179055 | 7/1999 |
| JP | 11200167 | 7/1999 |

OTHER PUBLICATIONS

English Language Abstract of JP 6–105959.
English language abstract of JP 9–299614.
English language abstract of JP 10–244072.
English language abstract of JP 11–200167.
English language abstract of JP 11–179049.
English language abstract of JP 11–179055.
English language abstract of JP 8–280933.

* cited by examiner

Primary Examiner—Valencia Martin-Wallace
Assistant Examiner—Julie Brocketti
(74) Attorney, Agent, or Firm—Greenblum & Bernstein, P.L.C.

(57) ABSTRACT

The present invention has an object to permit change the progressing rate of time during a battle period in response to the skill and experience of the player in a game apparatus. The controller unit, upon detection of start of a battle between characters, changes the progressing rate of time during the battle period, from the progressing rate of time during a non-battle period in response to any of a plurality of pieces of rate information previously prepared for regulating the progressing rate of time during the battle period. The controller unit, the audio process unit and the graphics process unit adjust the executing timing of the character in response to the changed progressing rate of time during the battle period. As a result, when the progressing rate of time during the battle period is changed, it is possible to cause the character to execute an action in response to such a change.

12 Claims, 10 Drawing Sheets

| ITEM | | ITEM DATA |
|---|---|---|
| ACTION MODE | ACTIVE MODE | 1 |
| | WAIT MODE | 0 |
| STANDBY TIME | CHARACTER A | 150 |
| | CHARACTER B | 231 |
| | CHARACTER C | 168 |
| | ⋮ | ⋮ |
| BATTLE SPEED | | 0.75 |
| MEASURED TIME DATA | FRIEND CHARACTER | 47 |
| | ENEMY CHARACTER | 96 |

20a — ACTION MODE
20b — STANDBY TIME
20c — BATTLE SPEED
20d — MEASURED TIME DATA

GAME APPARATUS, GAME CONTROLLING METHOD AND RECORDING MEDIUM FOR USE WITH BATTLE VIDEO GAMES

BACKGROUND OF THE INVENTION

1. Field of the Invention

The present invention relates to a game apparatus which controls the game progressing rate, a game controlling method, and a recording medium.

2. Description of the Related Art

Various techniques have conventionally used in video games for adjusting the relative difficulty of games. For example, Japanese Unexamined Patent Publication No. 9-299614, a publication relating to this kind of technology, discloses a technique of adjusting the relative difficulty of a game by switching over the progressing rate of the game as a whole.

There are available, on the other hand, many kinds of games provided by video games. Some video games achieve on the display screen battles between a plurality of characters, including player characters operated by the player and enemy characters controlled by a computer. In a video game of this kind, the player character and the enemy character are caused to execute actions for attack or defense in accordance with an algorithm for controlling actions of characters contained in an operating input or in the game program. More specifically, execution of an action means execution of graphic display, audio output, and battle arithmetic processing corresponding to actions conducted by the player character or the enemy character in the game.

In such a battle scene, it is possible to achieve richer contents of the game by providing a certain limit on the thinking time of the player. In a video game, for this purpose, time is caused to lapse at a certain progressing rate during the battle period so that the state of battle between characters is varied in response to the time lapse. In such a game, for example, execution of actions of the individual characters is controlled in response to the lapse of time.

In order to set a relative difficulty of a game suitable for the skill and experience in such a video game, it suffices to variably control the progressing rate of time during the battle period. It also suffices to make contrivances for changing the progressing rate.

SUMMARY OF THE INVENTION

The present invention has an object to provide a game apparatus, a game controlling method and a recording medium thereof, permitting change of the progressing rate of time during the battle period in response to the skill and experience of the player.

To achieve the aforementioned object, the invention provides a game apparatus performing a video game in which battles are fought between characters, comprising detecting means detecting start of a battle between characters; changing means which, when start of the battle is detected by the detecting means, changes the progressing rate of time during the battle period from a progressing rate of time during a non-battle period in response to any of a plurality of pieces of rate information previously prepared for regulating the progressing rate of time during the battle period; and adjusting means for adjusting the executing timing of an action of a character in response to the progressing rate of time during the battle period changed by the changing means.

According to this aspect of the invention, the detecting means detects start of a battle between characters; the changing means changes, when start of the battle is detected by the detecting means, the progressing rate of time during the battle period from a progressing rate of time during a non-battle period in response to any of a plurality of pieces of rate information previously prepared for regulating the progressing rate of time during the battle period; and the adjusting means adjusts the executing timing of an action of a character in response to the progressing rate of time during the battle period changed by the changing means. It is therefore possible to change the progressing rate of time during the battle period from the progressing rate of time during the non-battle period and to cause execution of an action of the character at a timing in response to a change, if any, in the progressing rate of time during the battle period.

The game apparatus of the invention may have a configuration in which the game apparatus further comprises selecting means for selecting an arbitrary piece of rate information from the plurality of pieces of rate information for regulating the progressing rate of time during the battle period in response to an operating input made by a player.

According to this aspect of the invention, the selecting means selects an arbitrary piece of rate information from the plurality of pieces of rate information for regulating the progressing rate of time during the battle period in response to an operating input made by the player. The player can thus arbitrarily set a progressing rate of time during the battle period.

In these aspects of the invention, the aforementioned adjusting means may have a configuration comprising time measuring means for starting measurement of time from the starting point of a battle on the basis of the progressing rate of time during the battle period as changed by the changing means, or on the basis of the timing when an action of a first character in battle is completed; time measurement control means discontinuing measurement of time by the time measuring means for a period during which an action to be executed by a second character is specified in response to an operating input made by the player, and resuming measurement of time of the time measuring means upon the completion of the period for specification of the action of the second character; and permitting means which permits execution of an action to the first character when the time measured by the time measuring means reaches a prescribed time.

According to this aspect of the invention, the aforementioned adjusting means comprises time measuring means, time measurement control means and permitting means. The time measuring means starts measurement of time from the starting point of a battle on the basis of the progressing rate of time during the battle period as changed by the changing means, or on the basis of the timing when an action of a first character in battle is completed; the time measurement control means discontinues measurement of time by the time measuring means for a period during which an action to be executed by a second character is specified in response to an operating input made by the player, and resumes measurement of time of the time measuring means upon the completion of the period for specification of the action of the second character; and the permitting means permits execution of an action to the first character when the time measured by the time measuring means reaches a prescribed time. The player can thus delete the time of the period during which an action is specified for the second character from the time measured for permitting the first character to conduct an action.

Further in the invention, the aforementioned time measurement control means has a configuration in which the time measurement control means operates in a mode of interrupting time measurement during the period for specifying an action to the second character, or in a mode of continuing time measurement during the same period; and further comprises setting means for setting an operating mode of the time measurement means in response to an operating input made by the player.

According to this aspect of the invention, the time measurement control means operates in a mode of interrupting time measurement during the period for specifying an action to the second character, or in a mode of continuing time measurement during the same period. The setting means sets an operating mode of the time measurement means in response to an operating input made by the player. The player can therefore select and set any of the modes in response to his/her skill.

The invention provides a game control method for performing a video game in which a battle is fought between characters, comprising a detecting step of detecting start of a battle between characters; a changing step of changing, when start of the battle is detected in the detecting step, the progressing rate of time during the battle period from a progressing rate of time during a non-battle period in response to any of a plurality of pieces of rate information previously prepared for regulating the progressing rate of time during the battle period; and an adjusting step of adjusting the executing timing of an action of a character in response to the progressing rate of time during the battle period changed in the changing step.

The game control method further comprises a selecting step of selecting an arbitrary piece of rate information from the plurality of pieces of rate information for regulating the progressing rate of time during the battle period in response to an operating input made by a player.

In these aspects of the invention, the adjusting step comprises a time measuring step of starting measurement of time from the starting point of a battle on the basis of the progressing rate of time during the battle period as changed in the changing step, or on the basis of the timing when an action of a first character in battle is completed; a time measurement controlling step of discontinuing measurement of time in the time measuring step for a period during which an action to be executed by a second character is specified in response to an operating input made by the player, and resuming measurement of time of the time measuring step upon the completion of the period for specification of the action of the second character; and a permitting step of permitting execution of an action of the first character when the time measured in the time measuring step reaches a prescribed time.

In this aspect of the invention, the time measurement control step has a mode of interrupting time measurement during the period for specifying an action to the second character, and a mode of continuing time measurement during the same period; and further comprises a setting step of setting an operating mode in the time measuring step in response to an operating input made by the player.

By causing the computer to execute processing through these steps, it is possible to obtain the same effects as in the aspects of the invention of the aforementioned game apparatus. It is therefore possible to easily apply the game technology of the invention with this configuration of hardware by executing the mentioned process steps with the use of the hardware such as the computer.

The invention also provides a computer-readable recording medium recording a program for performing a video game in which a battle is fought between characters, recording a program for executing a detecting step of detecting start of a battle between characters; a changing step of changing, when start of the battle is detected in the detecting step, the progressing rate of time during the battle period from a progressing rate of time during a non-battle period in response to any of a plurality of pieces of rate information previously prepared for regulating the progressing rate of time during the battle period; and an adjusting step of adjusting the executing timing of an action of a character in response to the progressing rate of time during the battle period changed in the changing step.

The recording medium of the invention may have a configuration further comprising a selecting step of selecting an arbitrary piece of rate information from the plurality of pieces of rate information for regulating the progressing rate of time during the battle period in response to an operating input made by the player.

In this aspect of the invention, the adjusting step may have a configuration comprising a time measuring step of starting measurement of time from the starting point of a battle on the basis of the progressing rate of time during the battle period as changed in the changing step, or on the basis of the timing when an action of a first character in battle is completed; a time measurement controlling step of discontinuing measurement of time by the time measuring step for a period during which an action to be executed by a second character is specified in response to an operating input made by the player, and resuming measurement of time of the time measuring step upon the completion of the period for specification of the action of the second character; and a permitting step of permitting execution of an action of the first character when the time measured by the measuring step reaches a prescribed time.

In this aspect of the invention, the time measurement controlling step may have a configuration comprising a mode of interrupting time measurement during the period for specifying an action to the second character, and a mode of continuing time measurement during the same period; and further comprising a setting step of setting an operating mode in the time measurement controlling step in response to an operating input made by the player.

The aforementioned game apparatus of the invention can be achieved by reading in the program thus contained in the recording medium into the computer. It is therefore possible to easily distribute and sell the recording medium as a software product independent of the apparatus. By using this software product by the use of hardware such as a computer, the game technology of the invention can easily be applied with this hardware configuration.

The invention provides also provides a computer data signal contained in a carrier for causing a computer to execute a detecting step of detecting start of a battle between characters; a changing step of changing, when start of the battle is detected in the detecting step, the progressing rate of time during the battle period from a progressing rate of time during a non-battle period in response to any of a plurality of pieces of rate information previously prepared for regulating the progressing rate of time during the battle period; and an adjusting step of adjusting the executing timing of an action of a character in response to the progressing rate of time during the battle period changed in the changing step.

The aforementioned game apparatus of the invention can be achieved by reading in such a computer data signal into the computer.

DESCRIPTION OF THE PREFERRED EMBODIMENTS

Embodiments of the present invention are now discussed, referring to the drawings. Discussed below is a home game apparatus, in which the present invention is applied, but the present invention is not limited to the home game apparatus.

Figure 1:
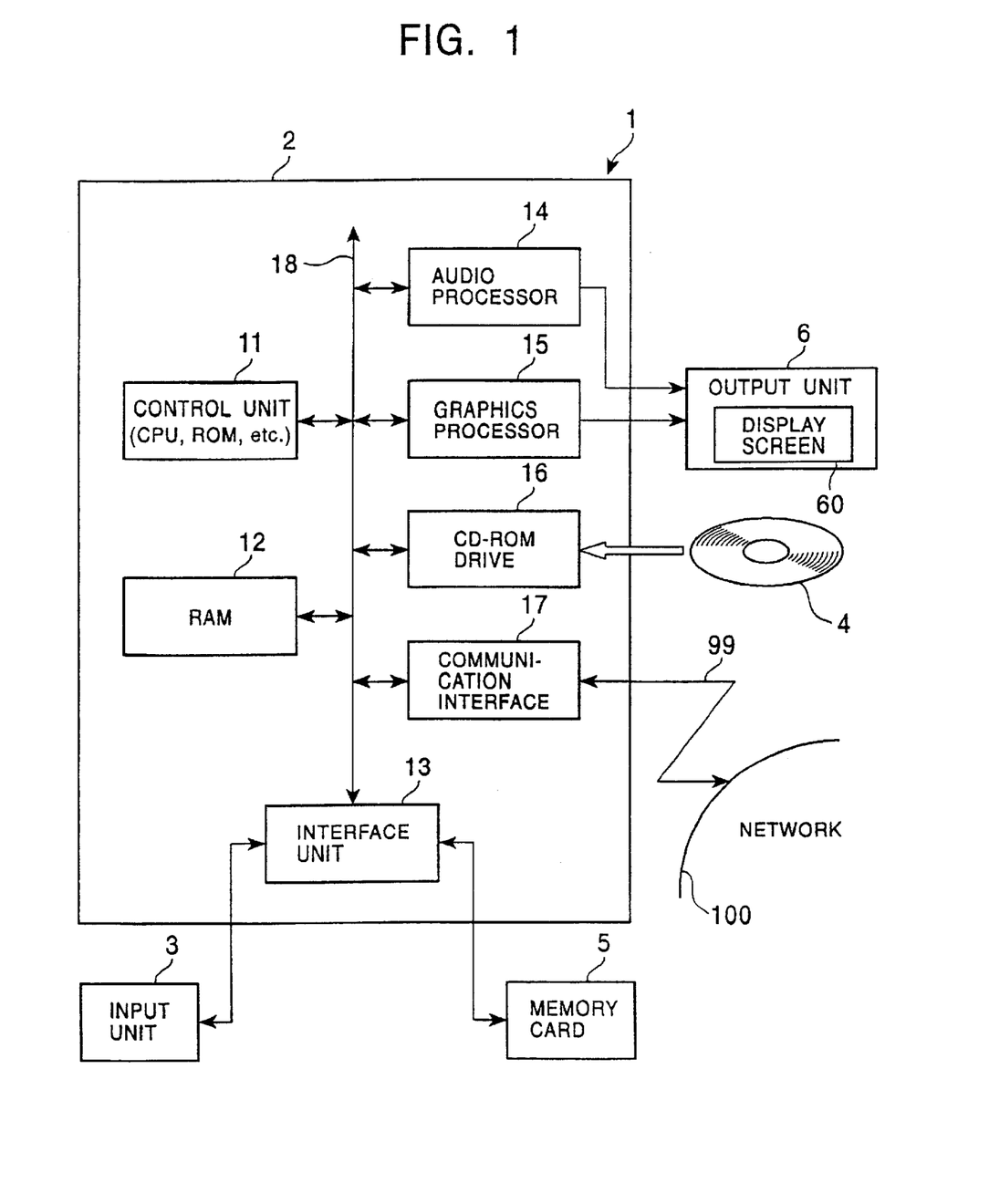
FIG. 1 is a block diagram illustrating an entire configuration of the game system of the present invention.

FIG. 1 is a block diagram generally showing a game apparatus 1 of the present invention.

The game apparatus 1 includes a game apparatus main unit 2 performing major functions of the game apparatus 1, an input unit (i.e., a controller) 3 for entering a manual input to the game apparatus main unit 2, a memory card 5 for storing data, such as game environment setting data and game progress data, and an output unit 6 for outputting a video image and sound in accordance with the content of a game, based on a video signal and an audio signal from the game apparatus main unit 2. The game apparatus main unit 2 includes a controller unit 11, a RAM (Random Access Memory) 12, an interface unit 13, an audio processor 14, a graphic processor 15, a CD-ROM drive 16, a communication interface 17, and a bus 18 for interconnecting these units.

Loaded into and unloaded from the CD-ROM drive 16 is a storage medium 4, such as a CD-ROM (compact disc—Read only Memory), which stores programs for performing game playing processes, video data and audio data.

The controller unit 11 is a circuit composed of a CPU (Central Processing Unit), a ROM (Read Only Memory), etc. The CPU controls each unit in accordance with programs stored in RAM 12 (or in ROM, as required). The controller unit 11, including an oscillator and a timer counter (both not shown), generates a clock signal in response to a timing signal regularly output from the oscillator, and performs time measurement by counting the clock signal through its counter.

The input unit 3 and the memory card 5 are detachably connected to the interface unit 13. The interface unit 13 controls data transfer between units connected to the bus 18 (particularly, the controller unit 11) and the input unit 3 or the memory card 5.

The audio processor 14 generates sound with effects, such as a BGM (Background Music) for a game. In response to a command from the controller unit 11, the audio processor 14 generates an audio signal using data stored in RAM 12, and outputs it to the output unit 6.

The graphics processor 15, including a frame buffer (not shown), draws a video image in response to the command from the controller unit 11, on the frame buffer. The graphics processor 15 generates a video signal to display the video data drawn onto the frame buffer and outputs the video signal to the output unit 6.

The CD-ROM drive 16 is a reading unit for reading data stored in a CD-ROM (storage medium 4). The game apparatus 1 performs control for a game playing by allowing the controller unit 11 to perform control in accordance with a game program stored in the CD-ROM.

The communication interface 17 performs communication control for data exchange between units on a network 100, and is connected to the network 100 through a communication line 99, as necessary.

Figure 2:
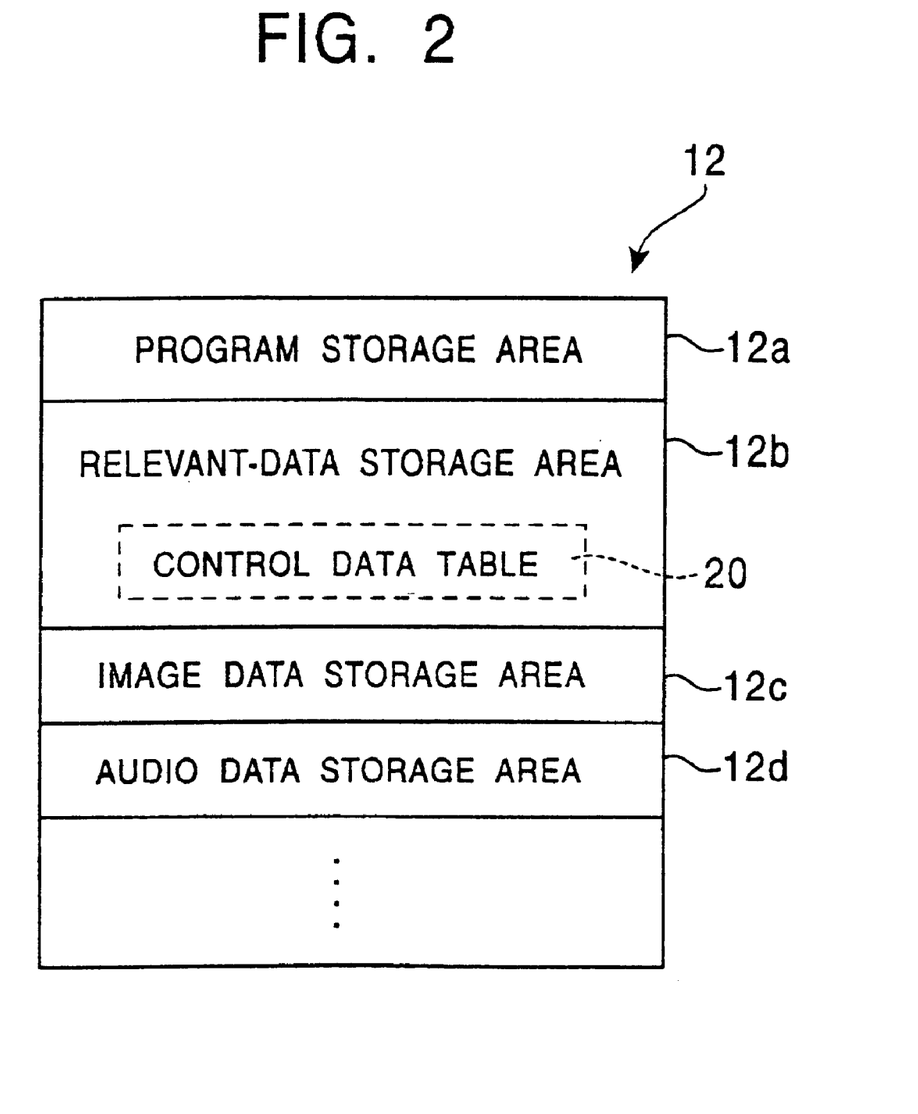
FIG. 2 illustrates an area allocated to RAM shown in FIG. 1.

FIG. 2 shows a memory structure of RAM 12 shown in FIG. 1.

RAM 12 includes a program storage area 12a for storing programs to be executed by the controller unit 11, a relevant-data storage area 12b for storing data, required to execute various; processes in the game, such as a control data table 20, an image data storage area 12c for storing various image data used in the game, and an audio data storage area 12d storing audio data such as a BGM and acoustics.

Figure 3:
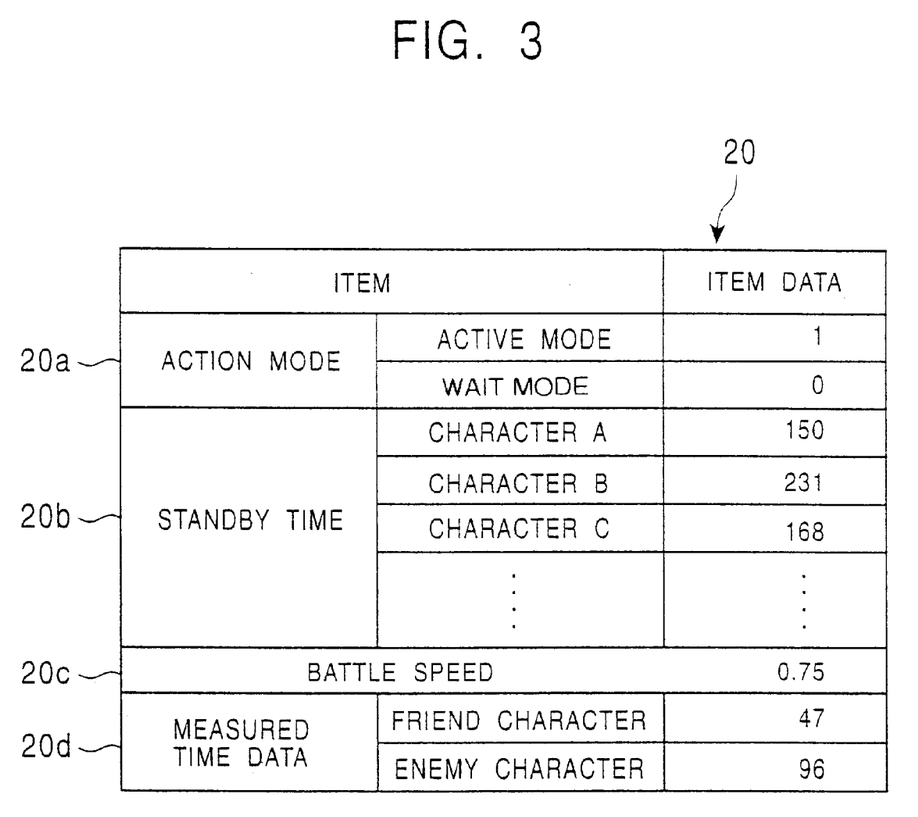
FIG. 3 illustrates a control data table to be stored in the relevant data storage area shown in FIG. 2.

FIG. 3 illustrates the data structure of the control data table 20 stored in the relevant-data storage area 12b shown in FIG. 2.

The control data table 20 stores various data for controlling the standby time when a battle is fought with an enemy character, i.e., a character controlled by the computer. The control process of the waiting time will be described later. In the example shown in FIG. 3, the control data table 20 has a configuration comprising an "action mode" column 20a, a "waiting time" column 20b, a "battle speed" column 20c and a "time measuring data" column 20d.

Further, the "action mode" column 20a has an "active mode" item and a "wait mode" item. These "active mode" item and the "wait mode" item exclusively store a flag "0" or "1" as respective item data. In the example shown in FIG. 3, for instance, in which the active mode has a flag "1" and the wait mode has a flag "0", the active mode is valid, and the wait mode is invalid.

The "waiting time" column 20b has individual items for all the enemy characters and player characters operated by the player, or for the characters covered by the control of the waiting time, and stores a set value of waiting time during a battle for each item of characters. The set values of waiting time are set on the basis of count values on a timer counter counted in units of a prescribed time. For instance, in the example shown in FIG. 3, set values of waiting time for character A, character B and character C are "150", "231" and "168", respectively. The term the "waiting time" as herein used means a time required for a character from the completion of an action until it can execute the next action. During waiting, i.e., after the completion of an action, the character cannot conduct any action until the measured time reaches the set value of waiting time. When the set value of waiting time is large, i.e., with a long waiting time, the character cannot frequently execute actions during a battle, and susceptible to attack from the enemy character during waiting, thus putting the character at a disadvantage. When the set value of waiting time is small, i.e., with a short set time of waiting time, in contrast, the character can frequently conduct actions during a battle, thus permitting more attacks than from the enemy character during waiting, leading to a more favorable position.

The time measurement of the waiting time is controlled in the aforementioned active mode or wait mode. While the player selects the next action for his/her character, the wait mode interrupts time measurement of standby time for the enemy character. In the active mode, on the other hand, time measurement of waiting time for the enemy character is continued. In the active mode, therefore, if it takes the player much time for selecting an action for his/her character, the player may suffer from a disadvantage in that the enemy character makes an attack during the selection of an action. In the wait mode, in contrast, even when it takes the player much time for selecting an action for his/her character, time measurement of waiting time for the enemy character is interrupted for that period, and the waiting time for the enemy character never reaches the set time. The player thus never suffers from a disadvantage. More specifically, the active mode is for a skilled player, the wait mode is for beginners.

The "battle speed" column 20c stores battle speed data which are rate information for setting a progressing rate of time during the battle period. Battle speed data, not limitative, comprise for example such numerical values as "0.50", "0.75", "1.00", "1.25" and "1.50". From among these five numerical data, the data set by the player in the environment setting process (see FIG. 4) described later will be stored as the item data of the "battle speed" column 20c. In the example shown in FIG. 3, "0.75" is stored as the battle speed data. The progressing rate of time during the battle period is changed by changing this battle speed data. More specifically, when a case where a battle period of five minutes elapses within a game upon playing for a minute of a battle scene of the game by the player is assumed to be a standard battle speed, and the speed data for this standard battle speed is "1.00", a change in the battle speed data value to "0.50" leads to the lapse of the battle period by ten minutes within the game when the player has played the battle scene of the game for one minute.

The "time measuring data" column 20d stores time measuring data taking account of the battle speed measured from the timing of completion of execution of one action for each of the player character and the enemy character participating in the battle. The value of time measuring data is a count value of a timer taking account of the battle speed. In the example shown in FIG. 3, the time measuring data "47" and "96" are stored in the items "player character" and "enemy character" of the "time measuring data" column 20d.

The values of waiting time data stored in the "waiting time" column 20b of the control data table 20 may be variably controlled in response to values of the degree of game progress and the growth level set for the characters. For example, control is conducted so as to achieve a smaller value of waiting time data of the character according as the degree of game progress becomes larger and the growth level of the character becomes higher.

In this embodiment, the game apparatus performing a video game in which a battle is fought between characters is based on a process comprising the steps of detecting start of a battle between characters, changing the progressing rate of time during the battle period from the progressing rate of time during the non-battle period on the basis of the battle speed data selected by the player, and adjusting the timing for executing an action of a character in response to the progressing rate of time during the thus changed battle period. The game apparatus 1 therefore comprises detecting means detecting start of a battle between characters, selecting means selecting battle speed data, changing means changing the progressing rate of time on the basis of the battle speed data, and adjusting means adjusting the timing for performing an action of a character. In this embodiment, the waiting time of an action of each character is measured upon adjusting the executing timing of an action of the character; the manner of time measurement is controlled on the basis of a mode set by the player (an active mode or a wait mode); and execution of the action of the character is permitted when the measured standby time reaches a set value. The game apparatus 1 therefore comprises time measuring means measuring the waiting time, setting means setting an action mode, time measurement control means controlling the manner of time measurement, and permitting means permitting an action.

The operation of the game apparatus 1 of the embodiment is now specifically discussed.

At a startup, the controller unit 11 reads a program and data, required to execute a game, from the CD-ROM as the storage medium 4 through the CD-ROM drive 16, in accordance with the operating system stored in the internal ROM, and transfers them to RAM 12. The controller unit 11 performs the following processes by executing the program transferred to RAM 12.

The program and data, required to carry out the game, are successively read from the CD-ROM as the storage medium 4 in response to a command from the controller unit 11 in step with the progress of the game, and are transferred to RAM 12.

The discussion of the reading of the data from the CD-ROM and the transfer of the data to RAM 12 is omitted because these operations are not important in the context of the present invention.

Figure 4:
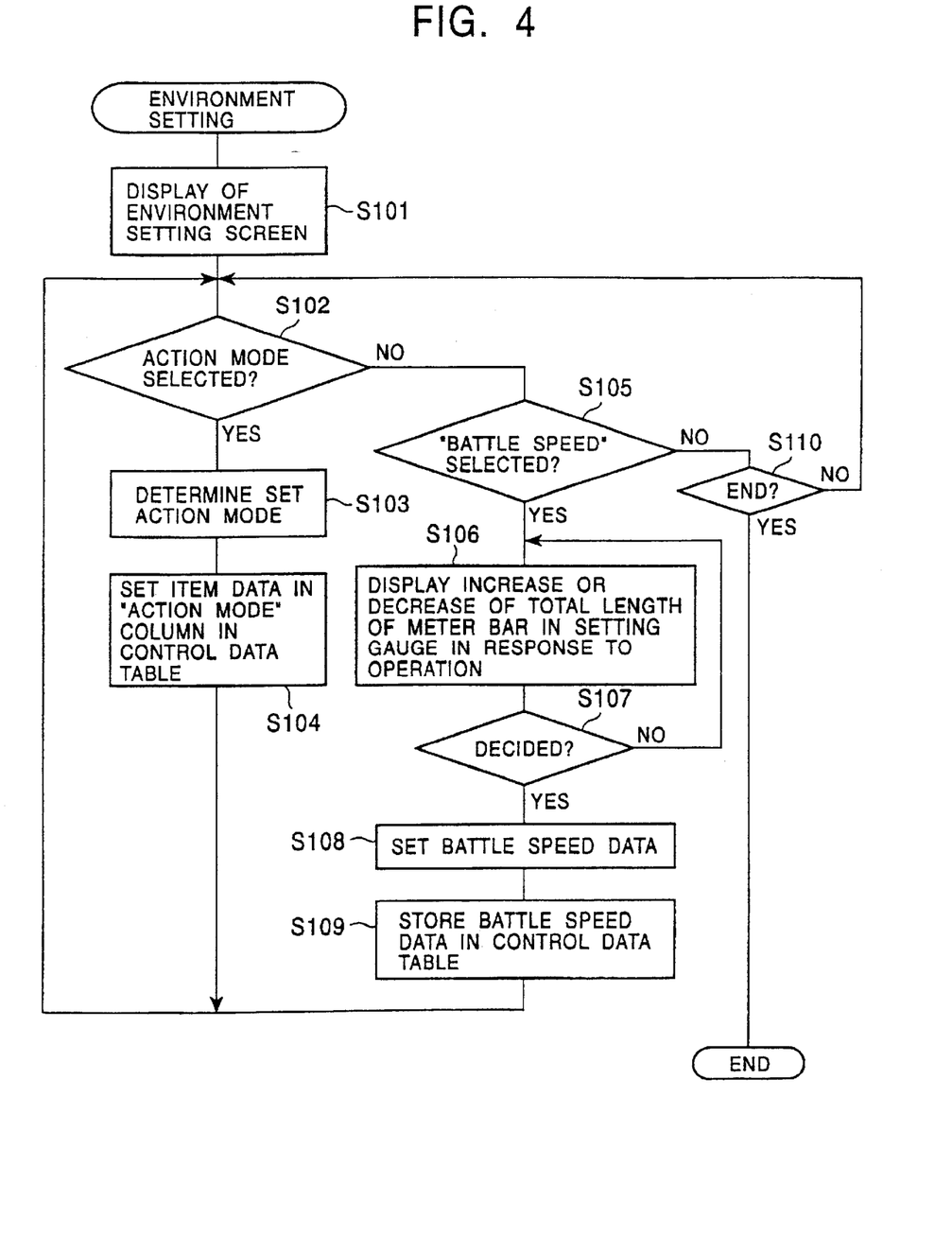
FIG. 4 is a flowchart illustrating the environment setting process executed by the control unit of FIG. 1.
Figure 5:
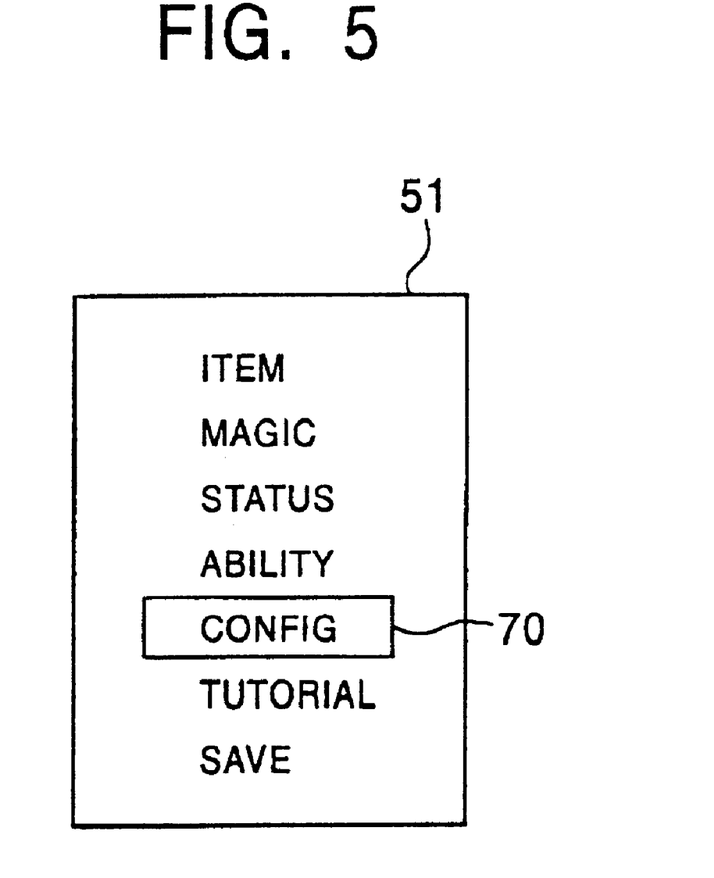
FIG. 5 illustrates an example of menu window displayed on the screen.

FIG. 4 is a flowchart illustrating the environment setting process executed by the controller unit 11 shown in FIG. 1. When opening the menu window is instructed from the input unit 3 during the game, the controller unit 11 causes a menu window 51 shown in FIG. 5 to be displayed on a display screen of an output unit 6 through a graphics process unit 15. When a "CONFIG" command is selected from this menu window 51 by a cursor 70 operated by the player, the environment setting process described below is started.

Figure 6:
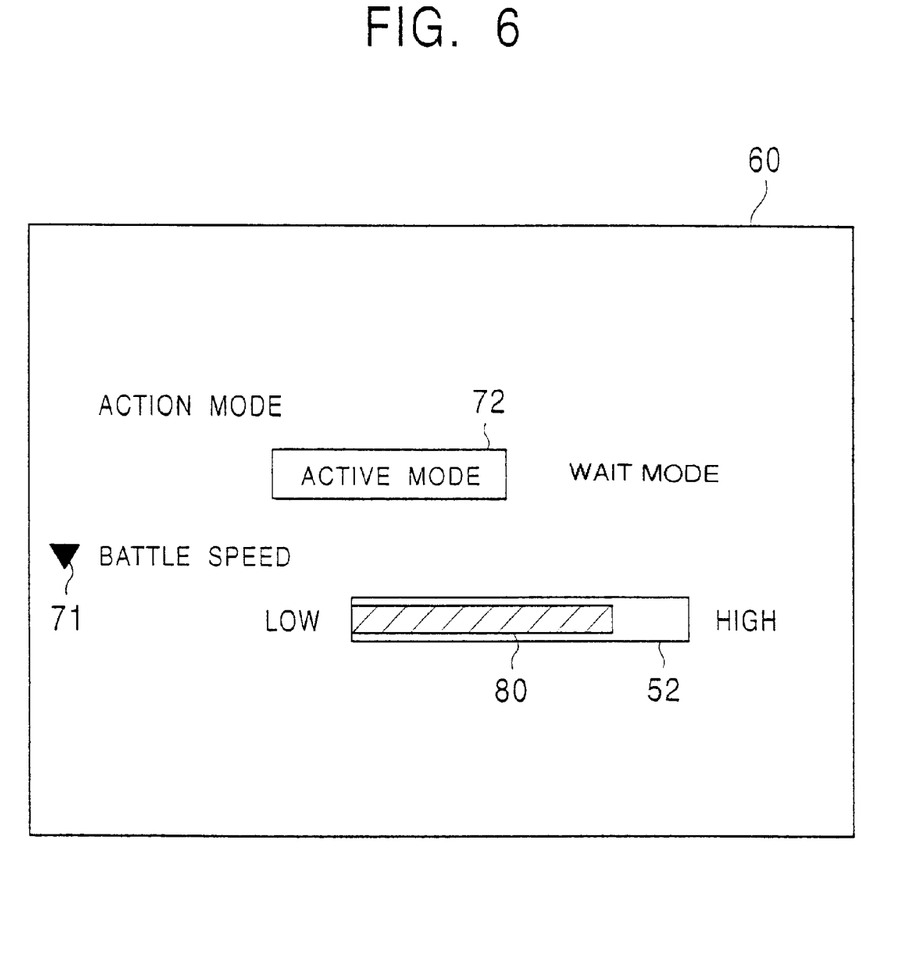
FIG. 6 illustrates an example of partial display on the environment setting screen displayed on the screen in the environment setting process shown in FIG. 4.

Upon start of the process, the controller unit 11 first causes the environment setting screen to be displayed on the screen of the output unit 6 through the graphics process unit 15 (step S101). FIG. 6 illustrates an example of partial display of the environment setting screen as displayed on the screen 60 of the output unit 6. In this embodiment, as shown in FIG. 6, there are provided an item "action mode" and an item "battle speed" as environment setting items. The item "battle speed" is provided with a setting gauge 52 for setting a battle speed and a meter bar 80. Cursors 71 and 72 moving in response to an operating instruction from the input unit 3 are displayed on the screen 60. The cursor 71 is for selecting an item to be set from among the item "action mode" and the item "battle speed", and the cursor 72 is for selecting the "active mode" or the "wait mode" in the item "action mode".

The controller unit 11 determines whether or not the item "action mode" has been selected by the cursor 71 (step S102), and when the item "action mode" has been selected, executes processes shown in the following steps S103 and S104.

More specifically, it is determined which of the "active mode" and the "wait mode" has been set in response to the operating instruction from the input unit 3 (step S103). The item data of the "action mode" column 20*a* of the control data table 20 (see FIG. 3) is set on the basis of the thus determined set mode (step S104). In this example, "1" is stored as the item data of the specified action mode, and "0", as the other item data. Subsequently, the process goes back to the selection step of step S102.

On the other hand, when the item "action mode" is determined not to have been selected in the aforementioned step S102, the controller unit 11 determines whether or not the item "battle speed" has been selected by the cursor 71 (step S105). When the item "battle speed" has not been selected, the controller unit 11 determines whether or not the environment setting process is to be ended (step S110). The process is thus discontinued, or when the process is not discontinued, the process returns to the selecting step of the action mode of step S102. When the item "battle speed" is selected in step S105, processes shown in the following steps S106 to S109 are executed.

That is, the total length of the meter bar 80 in the setting gauge 52 is caused to be displayed with an increased or decreased value by the graphics process unit 15 in response to an operating input from the input unit 3 (step S106). Then, when a total length of the meter bar 80 in the setting gauge 52 is determined (step S107), a value of battle speed data is set on the basis of this total length of the meter bar 80 (step S108).

More specifically, numerical value data of five stages are previously prepared, for example, for values of battle speed data, as described above, and the controller unit 11 acquires a numerical value data corresponding to the total length of the meter bar 80, and sets it as the value of battle speed data. After storing the set battle speed data in the control data table 20 (see FIG. 3) of the relevant-data storage area 12*b* (step S109), the process returns to the selecting step of the action mode of step S102.

According to this environment setting process, the player can arbitrarily set a progressing rate of time (battle speed) during a battle. The player can arbitrarily set any of the "wait mode" and the "active mode" as the action mode.

Figure 7:
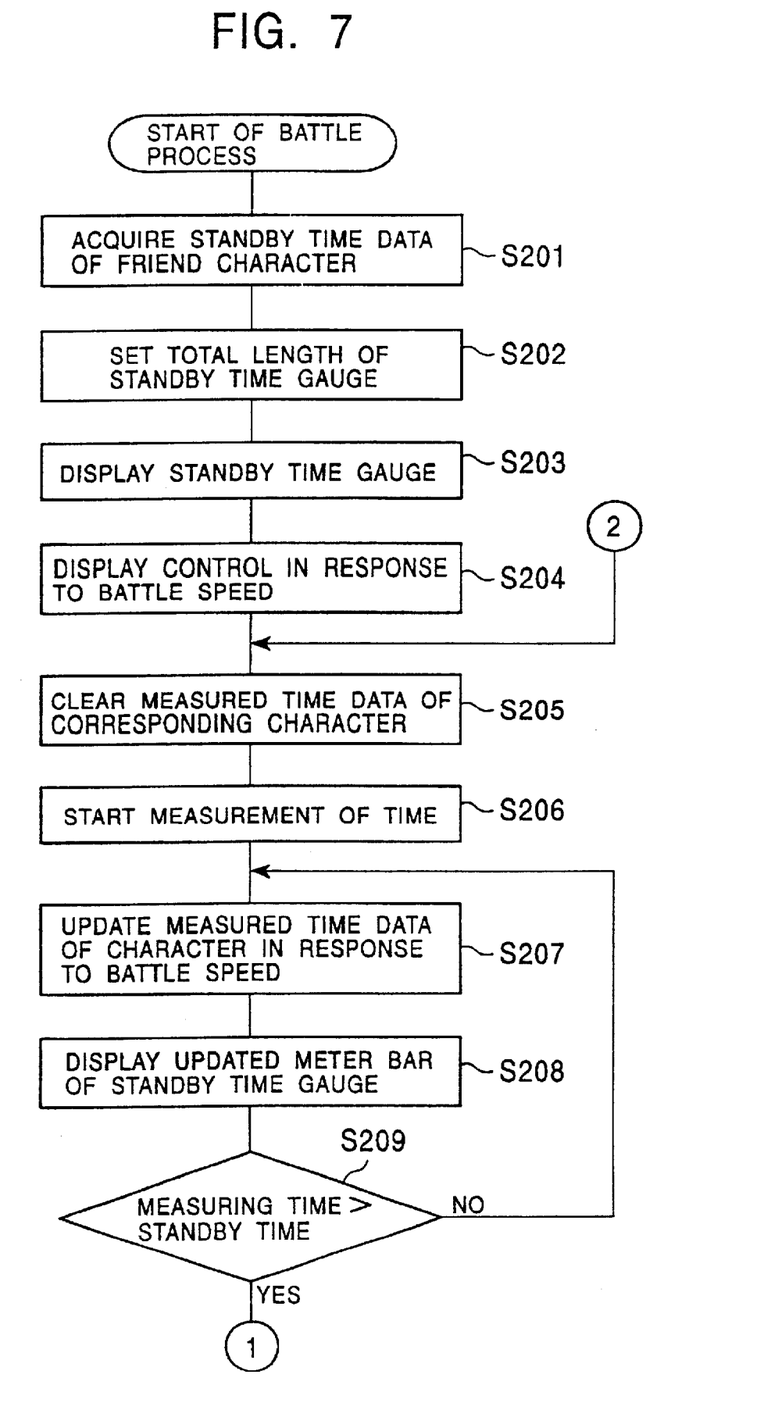
FIG. 7 is a flowchart (1) illustrating the battle process executed by the control unit shown in FIG. 1.
Figure 8:
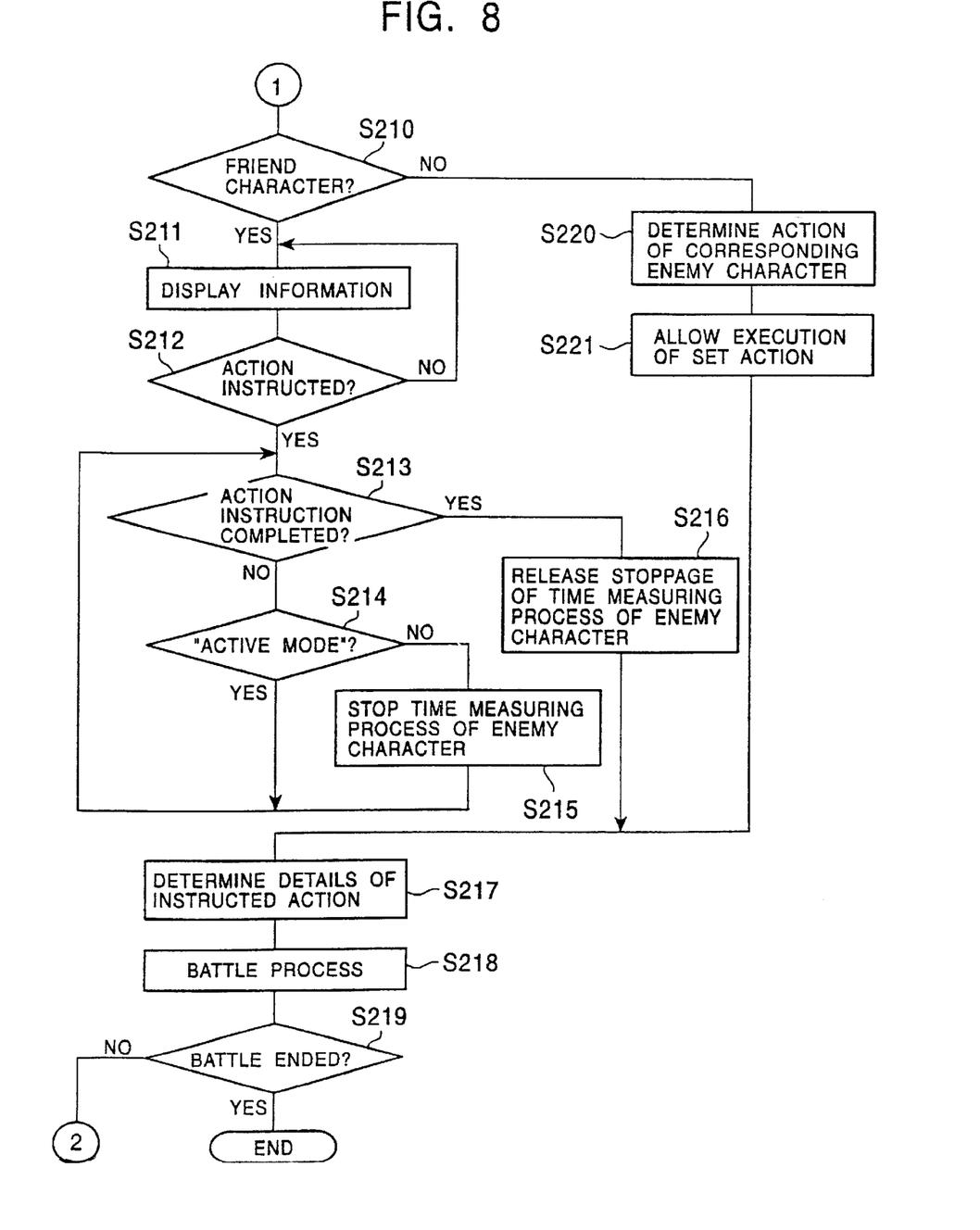
FIG. 8 is a flowchart (2) illustrating the battle process executed by the control unit shown in FIG. 1.

FIGS. 7 and 8 are flowcharts illustrating the battle process executed by the controller unit 11 shown in FIG. 1. In this battle process, a waiting-time gauge for causing the player to visually recognize the lapse of time during a battle only for the player character from among the characters fighting the battle (the player character and the enemy character) is displayed.

The controller unit 11 determines whether or not the player character has encountered the enemy character during the game and a battle is started. When start of a battle is determined, the following battle process is started.

First, the controller unit 11 executes a process for displaying the waiting-time gauge of the player character. That is, it acquires waiting data for the player character from the control data table 20 (see FIG. 3) of the relevant-data storage area 12*b* (step S201), and sets a total length of the waiting-time gauge to be displayed on the screen 60 of the output unit 6 on the basis of the thus acquired waiting time data (step S202). The waiting-time gauge 53 is displayed to the right bottom of the screen 60 or near the player character 54 as in the example of screen display shown in FIG. 9, for example, in a subsequent step.

Then, the controller unit 11 transfers the total length data of the waiting-time gauge and image data regarding the waiting-time gauge read out from the image data storage area 12*c* of the RAM 12 to the graphics process unit 15 to instruct display of the waiting-time gauge. In response to this instruction, the graphics process unit 15 displays the waiting-time gauge 53 of the player character 54 on the screen 60 as shown in FIG. 9 (step S203).

Figure 9:
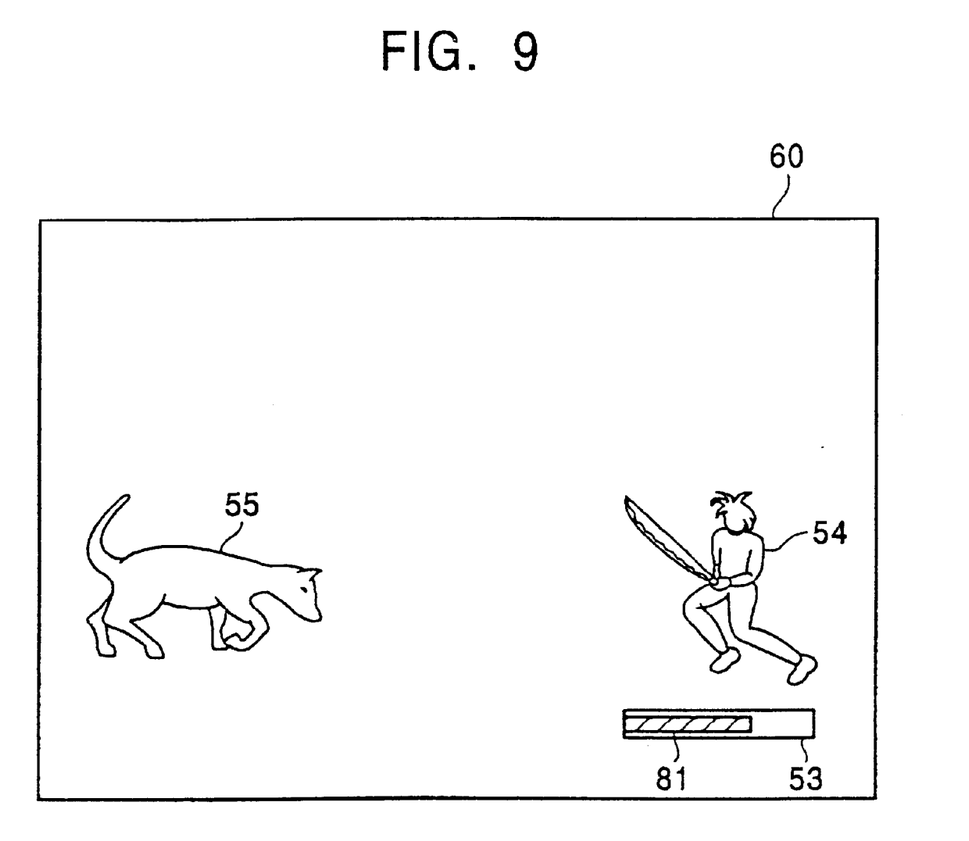
FIG. 9 illustrates an example of the battle scene displayed on the screen by the battle process shown in FIGS. 7 and 8.

FIG. 9 illustrates an example of battle scene displayed on the screen 60 by the battle process. Together with the player character 54 and the enemy character 55, the waiting-time gauge 53 indicating the time measuring status of the battle time (standby time) of the player character is displayed on the screen 60. A meter bar 81 which extends, for example, to the right gradually in proportion to the amount of time measurement is provided in the waiting-time gauge 53. When the total length of this meter bar 81 reaches the total length of the waiting-time gauge 53, the player can instruct the player character 54 to do an action such as an attack or defense, or use of an item through an operating input.

Referring to FIG. 7 again, the controller unit 11 which has displayed the waiting-time gauge 53 in step S203 then acquires a value of battle speed data from the control data table 20, and sets a progressing rate of time (battle speed) during the battle. It then starts graphics display control or sound output control in response to the set battle speed (step S204).

Subsequently, the controller unit 11 clears the value of time measuring data for the corresponding character of the characters fighting a battle at that point to be stored in the control data table 20 (step S205). Time measurement of the battle period is started for the character for whom the value of time measuring data has been cleared (step S206). At the start of the battle, however, values of time measuring data are cleared for all the player characters and enemy characters participating in the battle to start time measurement during the battle period for each character. After start of the battle, clearing of the value of time measuring data and resumption of measurement of the battle time are conducted for each character. That is, upon the completion of execution of an action by a character, the controller unit 11 clears the value of time measuring data for that character on the basis of the timing thereof, and starts time measurement of a new battle period.

After the start of time measurement of the battle period, the controller unit 11 calculates an increment of the measured time on the basis of the differential count value between the preceding count value and the current count value of the timer counter and the value of battle speed data. The value of the time measuring data for each character participating in the battle stored in the control data table 20 is updated on the basis of this value (step S207).

Then, the controller unit 11 updates and displays the meter bar 81 in the waiting time gauge 53 by means of the graphics process unit 15 in response to the value updated of time measuring data for the player character 54 (step S208). As a result of this processing, the meter bar 81 gradually extends, for example, to the right along with the lapse of time. The controller unit 11 determines whether or not the measured time of each character in the battle has reached the set value of waiting time (step S209), and when the measured time for any character has not reached the set value of waiting time, the process returns to step S207.

The controller unit 11, when it deems that the measured time for any character has reached the set value of waiting time, determines whether or not that character is the player character as shown in FIG. 8 (step S210). If the character for whom the measured time has reached the set value of waiting time is the enemy character, the controller unit 11 sets an action of the corresponding enemy character in accordance with an action control program for the enemy character previously included in the game program (step S220). The controller unit 11 permits execution of the set action (step S221), and goes forward to step S217 described later.

When the character for whom the measured time has reached the set value of waiting time is determined to be the player character, on the other hand, the controller unit 11 permits instruction of an action for the player character 54, and gives an informing display to that effect (step S211). Thereafter, the controller unit 11 determines whether or not an action instruction to the player character 54 is entered from the input unit 3 (step S212), and if the action instruction has not been entered, the process returns to step S211.

When the action instruction is determined to have been entered, on the other hand, the controller unit 11 determines whether or not the action instruction to the player character has been completed (step S213). When the action instruction is determined not to have been completed, the controller unit 11 determines whether or not the control mode is the "active mode" with reference to the item data of the "action mode" column 20*a* of the control data table 20 (step S214). When the control mode is determined to be the "active mode", the controller unit 11 returns the process to step S213 to wait for the completion of the action instruction. If the control mode is determined to be, not the "active mode", but the "wait mode", the controller unit 11 stops time measurement of the enemy character (step S215), returns the process to step S213, and waits for the completion of the action instruction.

When the action instruction is determined to have been completed instep S213, stoppage of time measurement of the enemy character is released (step S216). As a result of the processes of these steps S213 to S216, if the action mode is the "wait mode", time measurement for the enemy character 55 is discontinued for a period from the start of action instruction to the player character 54 until the completion of that action instruction. When the action mode is set to the "wait mode" therefore, time measurement for the enemy character 55 is discontinued for a period from the start of action instruction to the player character 54 until the completion of the action instruction.

Time measurement of the battle period for the enemy character 55 is thus discontinued for a period while the player selects and enters an action for the player character 54. Slow selection of an action for the player character 54 therefore never leads to a disadvantage of the player. This particularly useful as an assisting function for beginners.

Upon the completion of the processes of steps S216 and S221, the controller unit 11 determines contents of the action instructed to each character in battle (step S217). The controller unit 11 appropriately conducts executes battle processes such as necessary battle operating process, graphics display and sound output process on the basis of the determined contents of actions of the characters by means of the graphics process unit 15 and the sound process unit 14 (step S218). As a result of these processes, action display of the player character 54, action display of the enemy character 55 fighting therewith, display of the result of battle and output of audio effect sound are accomplished.

Then, the controller unit 11 determines whether or not the battle fought between the player character 54 and the enemy character 55 has been completed (step S219). When the battle has not as yet completed, the process returns to step S205 (see FIG. 7). If the battle is determined to have been completed, the battle mode process comes to an end.

FIGS. 10A to 10D illustrate examples of transition of display of the waiting-time gauge 53. The waiting-time gauge 53 is displayed on the screen 60 of the output unit 6 upon execution of the battle process. By watching this display, the player can visually and intuitionally recognize the time before he/she can instruct an action to the player character.

The total length of the waiting-time gauge 53 corresponds to the total time value required until the next action can be instructed to the player character 54. The meter bar 81 provided in this gage 53 shows the amount of measured time from the start of a battle, or from the completion of an action by the player character 54, i.e., the current status of time measurement. The meter bar 81 (hatched area) is displayed so as to extend, for example, to the right gradually along with the increase in the value of time already measured, as shown in FIGS. 10A to 10D in this sequence.

Figure 10A:
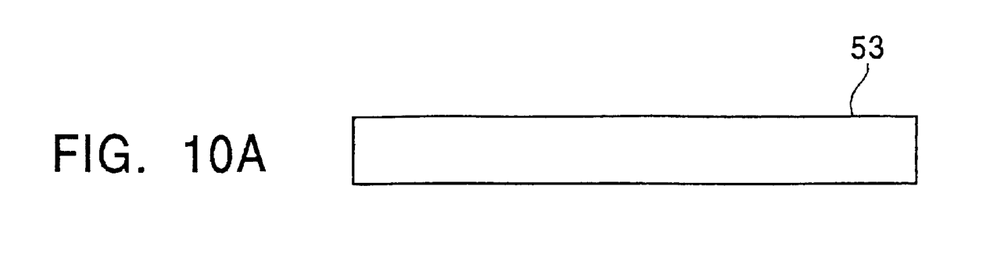
FIGS. 10A–10D illustrate an example of transition of the waiting-time gauge displayed on the screen by the battle process shown in FIGS. 7 and 8.
Figure 10B:
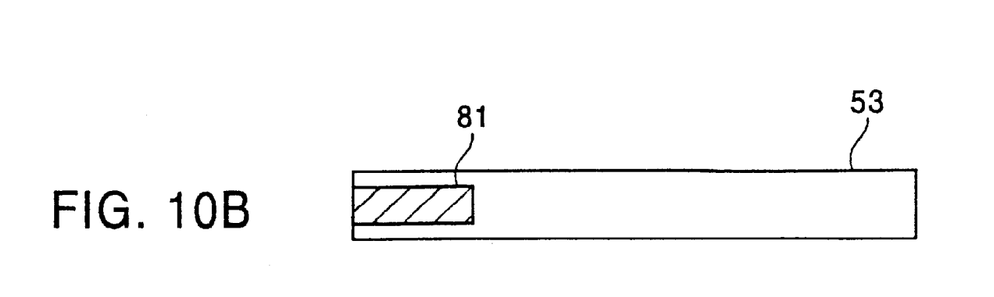
Figure 10C:
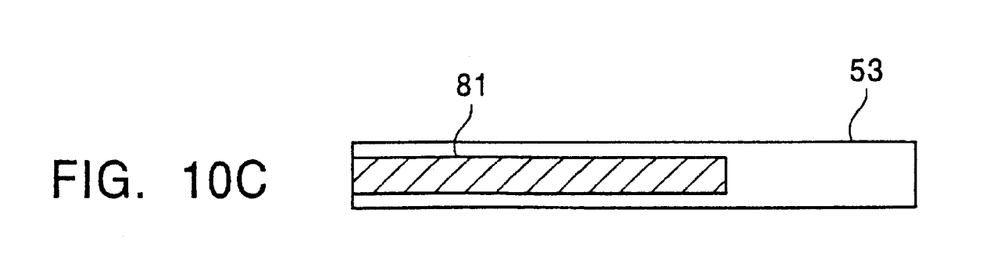
Figure 10D:
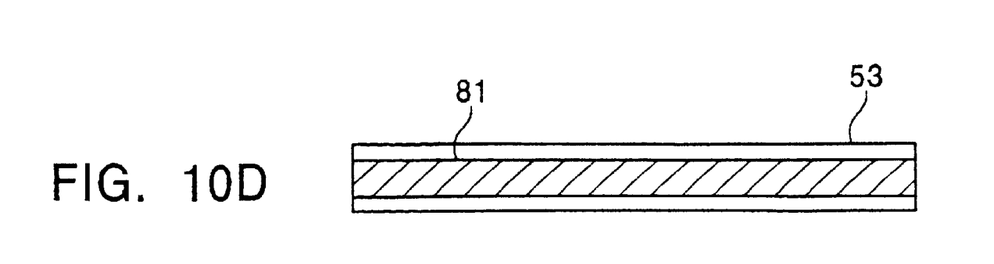

When the meter bar 81 extends, covering the entire length of the waiting-time gauge 53 as shown in FIG. 10D, the player can instruct the player character 54 to do an action by operating the input unit 3. When the player character 54 executes an action, the length of the meter bar 81, i.e., the measured time, is reset, and the meter bar 81 returns to the state shown in FIG. 10A. The update of the display of the meter bar 81 is repeated in response to the time measurement process and the time measured. In the wait mode, time measurement for the enemy character is discontinued for a period while the player instructs the player character 54 to do an action by operating the input unit 3.

As a result of information shown by the waiting-time gauge 53 and the meter bar 81, the player can immediately recognize after the lapse of what time he/she can instruct the player character 54 to conduct the next action.

According to this embodiment, as described above in detail, the progressing rate of time during a battle period is changed from the progressing rate of time during the non-battle period on the basis of battle speed data selected through a previous input operation by the player when once a battle is started, and the actions of the characters are executed at a timing corresponding to that changed progressing rate. The player can thus change the progressing rate of time during the battle period in response to his/her skill and experience. It is thus possible to fight a battle at a progressing speed suitable for the player.

According to this embodiment, the player can appropriately switch over between the wait "mode" useful for a beginner and the "active mode" useful for a skilled player. The player can therefore fight a battle in an action mode in response to the degree of skill of the player.

In the above-mentioned description, a case where a single player character fights with a single enemy character for easy understanding of the invention. However, the player may operate a plurality of player characters, and similarly there may be a plurality of enemy characters. Particularly, when there are a plurality of player and enemy characters, and time measurement of the battle period for all the other player characters and the enemy characters may be interrupted while the player selects and enters an action for a player character.

The present invention has been discussed in connection with the above-referenced embodiment. The present invention is not limited to the above embodiment, and changes and modifications may be performed within the scope of the present invention.

For example, in the above embodiment, the battle speed has been described to be selected in response to an input operation made by the player. However, the CPU of the game apparatus 1 may select battle speed data on the basis of the status of progress of the game and other conditions.

In the discussion of the above embodiment, the present invention is implemented in a home game apparatus as a platform. The present invention may be implemented in a commercially available computer such as a personal computer or an arcade game apparatus, as a platform.

In the discussion of the above embodiment, the programs and the data for carrying out the present invention are stored in a CD-ROM as a storage medium 4. The storage medium 4 is not limited to the CD-ROM. The storage medium 4 may be other computer readable medium, such as magnetic storage medium, an optical storage medium, or a semiconductor memory.

The form of the supplying of the programs and data for carrying out the present invention is not limited to the storage medium, such as a CD-ROM, detachably mounted on a game apparatus or a computer. specifically, the programs and data for carrying out the present invention may be downloaded from other apparatus on the network 100 via the communication line 99 and the communication interface 17 as shown in FIG. 1. The programs and data may be stored in other apparatus on the network 100 via the communication line 99, and may be stored in RAM 12, as necessary, via the communication line 99.

According to the present invention, as described above, the progressing rate of time during the battle period is changeable from the progressing rate of time during a non-battle period, and an action of a character is executed at a timing in response to a change in progressing rate of time during the battle period, if any. It is therefore possible to change the progressing rate of time during the battle period in response to the skill and experience of the player. The battle can thus be fought at a progressing speed appropriate for the player.

The present disclosure relates to subject matter contained in priority Japanese Patent Application No. HEI 11-072449, filed on Feb. 10, 1999, and Japanese Patent Application No. HEI 11-123260, filed on Apr. 30, 1999, the contents of both are herein expressly incorporated by reference in their entireties.

What is claimed is:

1. A game apparatus performing a video game in which battles are fought between characters, comprising:
    a detector that detects a start of a battle between characters;
    a changing system which, when the start of the battle is detected by said detector, changes a progressing rate of time during a battle period from a progressing rate of time during a non-battle period in response to any of a plurality of pieces of rate information previously prepared for regulating the progressing rate of time during the battle period; and
    an adjusting system that adjusts an executing timing of an action of a character in response to the progressing rate of time during the battle period changed by said changing system.

2. The game apparatus according to claim 1, wherein said game apparatus further comprises a selector that selects an arbitrary piece of rate information from said plurality of pieces of rate information for regulating the progressing rate of time during the battle period in response to an operating input made by a player.

3. The game apparatus according to claim 1, wherein said adjusting system further comprises:

a time measuring system that starts measurement of time from the start of the battle on a basis of the progressing rate of time during the battle period as changed by said changing system, or on a basis of a timing when an action of a first character in the battle is completed;
a time measurement control system discontinuing measurement of time by said time measuring system for a period during which an action to be executed by a second character is specified in response to an operating input made by a player, and resuming measurement of time of said time measuring system upon the completion of said period for specification of the action of said second character; and
a permitting system which permits execution of another action of said first character when the time measured by said time measuring system reaches a prescribed time.

4. The game apparatus according to claim 3, wherein said time measurement control system operates in a mode of interrupting time measurement during the period for specifying an action to said second character, or in a mode of continuing time measurement during the same period; and
    further comprises a setting system that sets an operating mode of the time measurement system in response to an operating input made by the player.

5. A game control method for performing a video game in which a battle is fought between characters, comprising:
    detecting a start of the battle between characters;
    changing, when the start of the battle is detected, a progressing rate of time during a battle period from a progressing rate of time during a non-battle period in response to any of a plurality of pieces of rate information previously prepared for regulating the progressing rate of time during the battle period; and
    adjusting an executing timing of an action of a character in response to the progressing rate of time during the changed battle period.

6. The game control method according to claim 5, wherein said game control method further comprises selecting an arbitrary piece of rate information from said plurality of pieces of rate information for regulating the progressing rate of time during the battle period in response to an operating input made by a player.

7. The game control method according to claim 5, wherein said adjusting further comprises:
    starting measurement of time from the start of the battle on a basis of the changed progressing rate of time during the battle period, or on a basis of a timing when an action of a first character in the battle is completed;
    discontinuing measurement of time for a period during which an action to be executed by a second character is specified in response to an operating input made by a player, and resuming measurement of time upon the completion of said period for specification of the action of said second character; and
    permitting execution of another action of said first character when the measured time reaches a prescribed time.

8. The game controlling method according to claim 7, wherein said discontinuing has a mode of interrupting time measurement during the period for specifying an action to said second character, and a mode of continuing time measurement during the same period; and
    further comprises setting an operating mode in response to an operating input made by the player.

9. A computer-readable recording medium recording a program for performing a video game in which a battle is fought between characters, recording the program for executing:

detecting a start of the battle between characters;

changing, when the start of the battle is detected, a progressing rate of time during a battle period from a progressing rate of time during a non-battle period in response to any of a plurality of pieces of rate information previously prepared for regulating the progressing rate of time during the battle period; and adjusting an executing timing of an action of a character in response to the progressing rate of time during the changed battle period.

10. The recording medium according to claim 9, wherein said recording medium further comprises selecting an arbitrary piece of rate information from said plurality of pieces of rate information for regulating the progressing rate of time during the battle period in response to an operating input made by a player.

11. The recording medium according to claim 9, wherein said adjusting further comprises:

starting measurement of time from the start of the battle on a basis of the progressing rate of time during the battle period as changed, or on a basis of a timing when an action of a first character in the battle is completed;

discontinuing measurement of time for a period during which an action to be executed by a second character is specified in response to an operating input made by the player, and resuming measurement of time upon the completion of said period for specification of the action of said second character; and permitting execution of another action of said first character when the measured time reaches a prescribed time.

12. The recording medium according to claim 11, wherein said discontinuing has a mode of interrupting time measurement during the period for specifying an action to said second character, and a mode of continuing time measurement during the same period; and further comprises setting an operating mode in response to an operating input made by the player.

* * * * *